United States Patent [19]

Kochi

[11] Patent Number: 5,191,426

[45] Date of Patent: Mar. 2, 1993

[54] CCD IMAGE PICKUP APPARATUS WITH DIGITAL SYNTHESIZED VIDEO OUTPUT SIGNAL

[75] Inventor: Nobuo Kochi, Tokyo, Japan

[73] Assignee: Kabushiki Kaisha TOPCON, Japan

[21] Appl. No.: 720,210

[22] Filed: Jun. 24, 1991

[30] Foreign Application Priority Data

Jun. 25, 1990 [JP] Japan .................. 2-164087

[51] Int. Cl.⁵ .................. H04N 3/14; H04N 5/335
[52] U.S. Cl. .................. 358/213.18; 358/213.26; 358/213.11
[58] Field of Search .............. 358/209, 213.28, 213.11, 358/21 R, 213.18, 213.26

[56] References Cited

U.S. PATENT DOCUMENTS

| | | | |
|---|---|---|---|
| 4,589,020 | 5/1986 | Akatsuka | 358/21 R |
| 4,679,090 | 7/1987 | Erhardt | 358/213.18 |
| 4,686,574 | 8/1987 | Erhardt | 358/213.18 |
| 4,803,554 | 2/1989 | Pape | 358/209 |
| 4,819,068 | 4/1989 | Cooper et al. | 358/113 |

Primary Examiner—Michael T. Razavi
Assistant Examiner—Wendy R. Greening
Attorney, Agent, or Firm—Ronald P. Kananen

[57] ABSTRACT

A CCD image pickup apparatus comprises a CCD having a plurality of horizontal scanning lines and a plurality of picture elements arranged along each of the horizontal scanning lines, a plurality of video output signal lines connected to the CCD in such a manner that a plurality of video output signals are produced by the CCD and introduced into the video output signal lines, a video signal synthesizing means for synthesizing the video output signals so as to produce a single video signal, and an A/D conversion means for analog-digital converting the single video signal produced by the synthesizing means so as to produce a digital signal. A sampling-hold means can be used between the amplifier and the synthesizing means in place of the A/D conversion means and the D/A conversion means.

25 Claims, 11 Drawing Sheets

PRIOR ART

FIG. 9

PRIOR ART

FIG. 10

PRIOR ART

FIG. 11

PRIOR ART

FIG. 12

PRIOR ART

FIG. 13

PRIOR ART

FIG. 14

PRIOR ART

FIG. 15

PRIOR ART

CCD IMAGE PICKUP APPARATUS WITH DIGITAL SYNTHESIZED VIDEO OUTPUT SIGNAL

BACKGROUND OF THE INVENTION

The present invention relates to a CCD image pickup apparatus.

Figure 8:
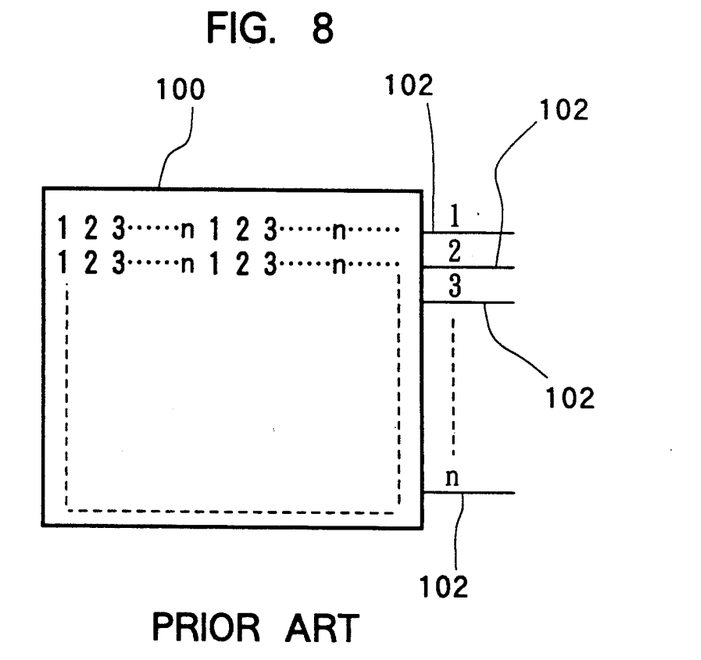
FIG. 8 is an explanatory view showing a video output condition of a conventional CCD.

A monochrome area CCD having a high density of picture elements has a plurality of separate video signal output lines. As shown in FIG. 8, this type CCD is a CCD 100 having plural horizontal scanning lines designed in such a way that a plurality of picture elements are arranged along each of the horizontal scanning lines in the form of identification numbers "1 2 3 ... n, 1 2 3 ... n, ... n". Video output signals are produced along each of the horizontal scanning lines in the form of identification numbers "1 2 3 ... n, 1 2 3 ... n, ... n" from the CCD 100. The picture elements are in parallel with the video output signals along the horizontal scanning lines.

It is an advantageous effect of such a type CCD that the frequency of one picture element is only 1/n of that of the prior art image pickup apparatus during the video signal processing and actuation of the CCD.

Figure 9:
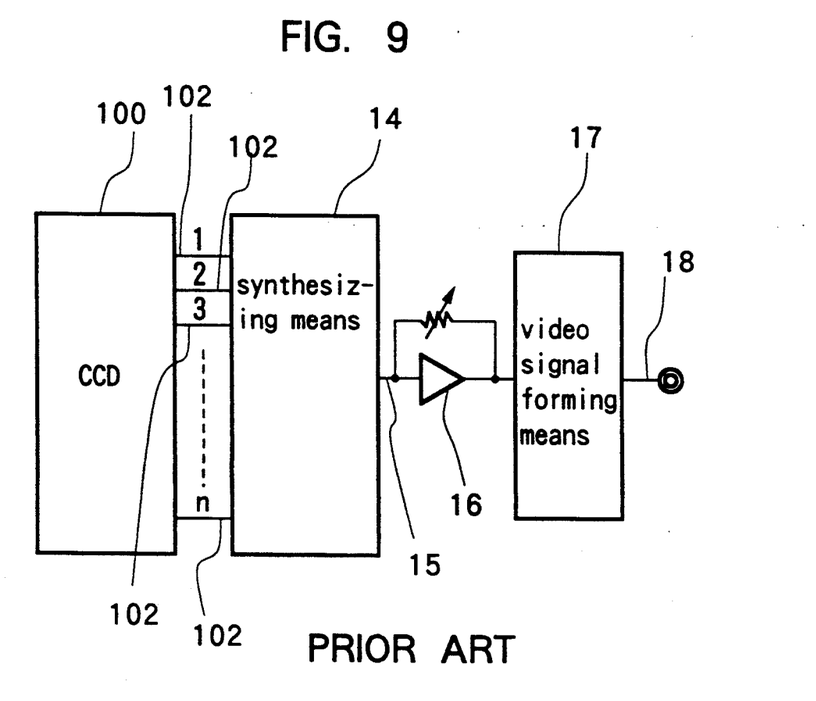
FIG. 9 is an explanatory view schematically showing a conventional CCD image pickup apparatus.

FIG. 9 schematically shows an apparatus for projecting on a monitoring TV or the like the video output signals which are picked up by and produced from the CCD 100. The video output signals numbered "1 2 3 ... n" are introduced into a synthesizing means 14 by way of plural CCD video signal lines having the numbers "1 2 ... n" from the CCD 100. The plural video signals having the numbers "1 2 ... n" from the CCD 100 are synthesized so as to produce a single video signal 15.

The video signal 15 is amplified by a video signal amplifier 16. This amplified signal is introduced into a video signal forming means 17 where various treatments such as addition of pedestal levels and/or synchronizing signals, gamma amendment and so on are carried out so as to produce a video signal output 18, in order to project the video signals on the monitoring TV or the like.

Figure 10:
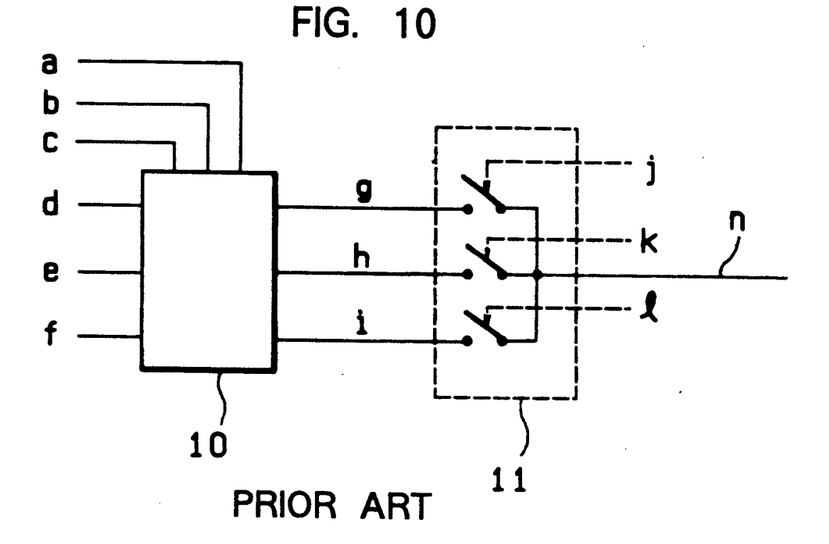
FIG. 10 is an explanatory view showing a conventional CCD image pickup apparatus for synthesizing three output signals from a CCD.

FIG. 10 shows an example of the synthesizing means 14 in which n is 3. For example, the synthesizing means 14 includes a sampling-hold means 10 for sampling-holding three video output signals d, e, f from the CCD and an analog switch portion 11 for synthesizing three output signals g, h, i after the sampling holding operation. If these video output signals d, e, f are already sampling-held, the sampling-hold means 10 is not necessary.

Figure 11:
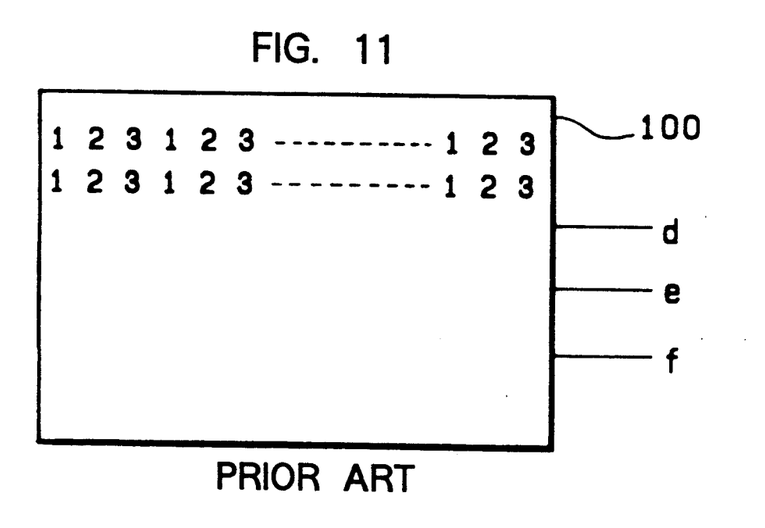
FIG. 11 is an explanatory view showing a CCD for producing three video output signals.
Figure 12:
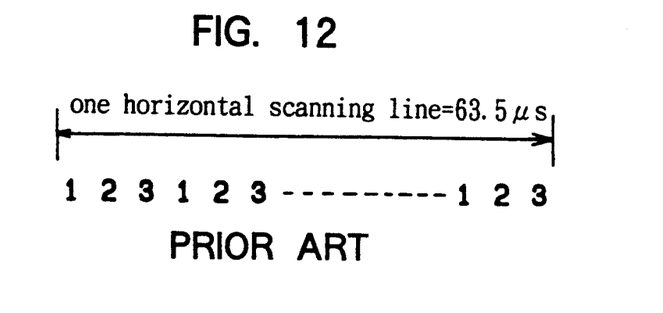
FIG. 12 is an explanatory view showing a condition in which three video output signals are arranged along a single horizontal scanning line.

FIG. 11 shows one picture element arrangement in the CCD 100 having plural horizontal scanning lines The picture elements numbered "1 2 3 1 2 3 ... 1 2 3" are arranged along each horizontal scanning line. The numbers "1 2 3" are arranged in a single picture element. If all picture elements along each horizontal scanning line are processed in order to produce desired electric signals, as shown in FIG. 12, it takes about 63.5 micro seconds. Therefore, signals from a single picture element can be obtained for the period which is about the scanning time per one horizontal scanning line (=63.5 micro seconds)/the number of the picture elements in a single horizontal scanning line.

Figure 13:
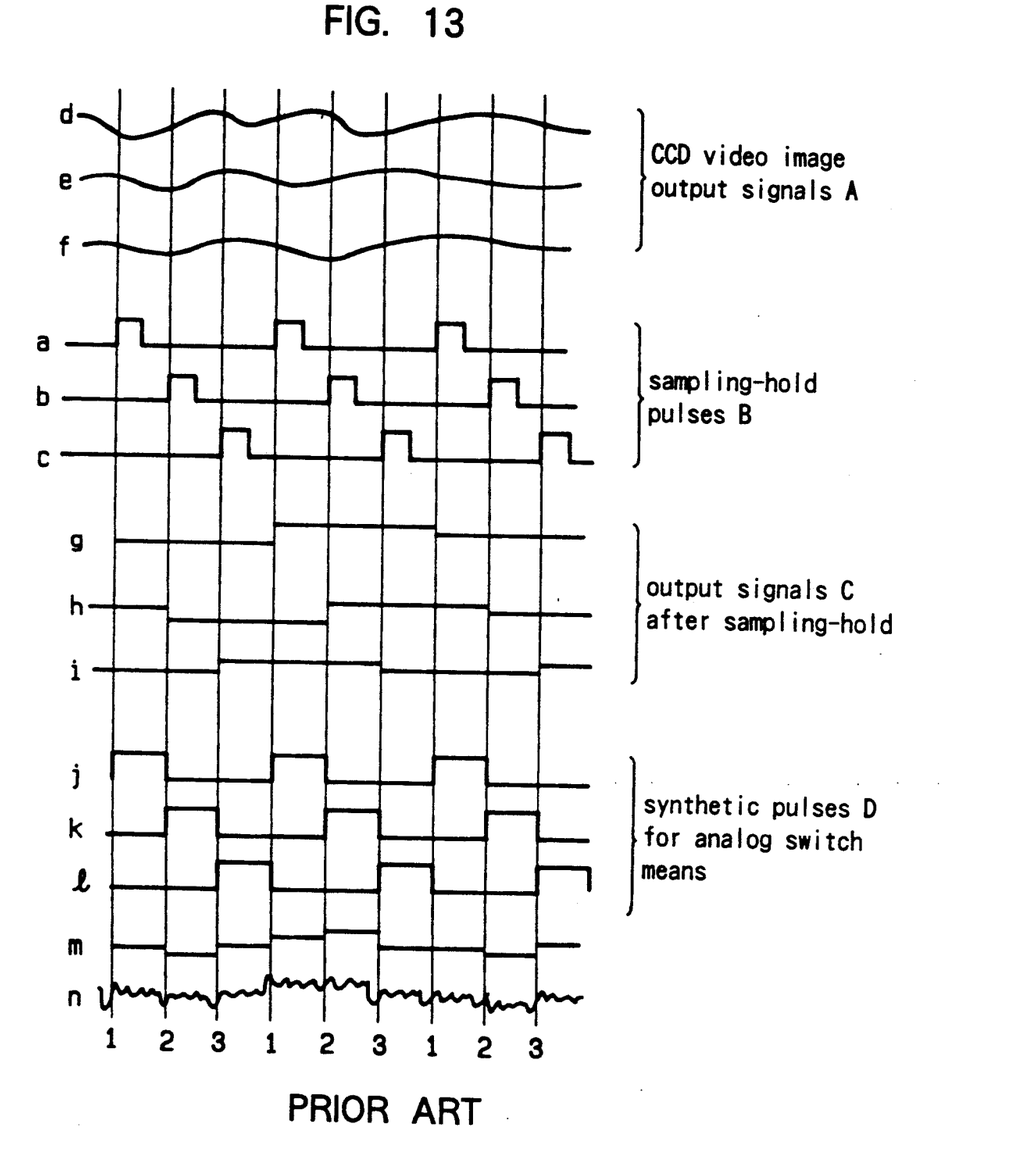
FIG. 13 is a view showing CCD output signals and sampling-holding pulses in the form of waves.

Assuming that the video output signals d, e, f from the CCD 100 are not sampling-held, the operation of the sampling-hold means 10 and the analog switching portion 11 will be explained, referring to FIG. 13.

As the video output signals A of the CCD 100 are the signals d, e, f in the form of analog signals, these signals d, e, f are sampling-held in response to the signals a, b, c (FIG. 10) of the sampling-hold pulses B. After the sampling-hold operation, the output signals C become the signals g, h, i as shown in FIG. 13. Incidentally, the output timing of the sampling-hold pulses is not limited to this mode and can be changed depending on a structure and use of the CCD.

The sampling-held output signals g, h, i are to be synthesized by the analog switching portion 11 shown in FIG. 10. The analog synthesized pulse signals D such as the signals j, k, l in FIG. 13 are introduced into the analog switching portion 11 which is switched to be open only in a high condition. As a result, a synthesized video signal like the signal m in FIG. 13 can be obtained in an ideal condition. In practice, however, the synthesized video signal n having noises is produced in the shape of a wave because they are affected by the digital waves such as the sampling-hold pulses a, b, c and the synthesized pulse signals j, k, l. The above-stated explanation can be also applied to plural lines having any number n.

Figure 14:
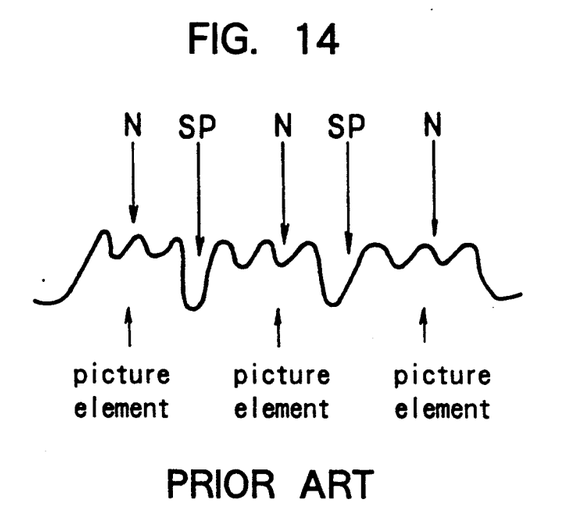
FIG. 14 is a view showing a synthesized CCD video output wave.

In the prior art, plural CCD video output signals having the number n are synthesized into a single CCD video output signal. As shown in FIGS. 13 and 14, spike noises SP produced at interconnection portions of adjacent picture elements and ringing and overshoot produced by synthesizing thereof affect the signals as noises N (hereinafter called synthetic spike noises). If the gain is set high so as to increase the sensitivity, those synthetic spike noises are emphasized so that longitudinal stripes or fringes can be observed on the monitoring TV. In addition, the resolution is decreased to a remarkable degree. As a result, it is very difficult to obtain a clear picture image having high resolution and high density.

In order to solve such a problem, it can be proposed to introduce the synthesized output into a filter so as to remove or cancel the synthetic spike noises. However, if such a filter is provided for the purpose of removing the synthetic spike noises, the resolution is decreased.

Figure 15:
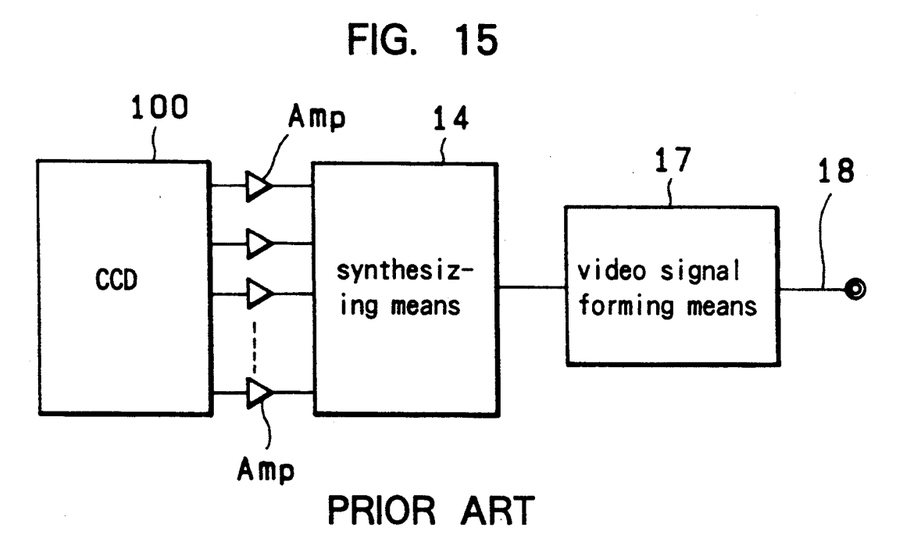
FIG. 15 is an explanatory view schematically showing a conventional CCD image pickup apparatus.

As shown in FIG. 15, it can be proposed to provide an amplifier Amp in each of the plural video output signal lines connected to the CCD 100 so as to amplify the signals and thereafter synthesize the signals in a synthesizing means 14. If plural amplifiers Amp are provided, however, arrangement space, consumed power, noises and so on must increase. Therefore, such a proposal is not practical.

SUMMARY OF THE INVENTION

The object of the present invention is to provide a CCD image pickup apparatus in which the resolution is not badly affected even in case of increased sensitivity and gain.

According to the present invention, a CCD image pickup apparatus comprises a CCD having a plurality of horizontal scanning lines and a plurality of picture elements arranged along each of the horizontal scanning lines, a plurality of video output signal lines connected to the CCD in such a manner that a plurality of video output signals are produced by the CCD and introduced into the video output signal lines, a video signal synthesizing means for synthesizing the video output signals so as to produce a single video signal, and an analog-digital conversion means (hereinafter called A/D conversion means) for analog-digital conversion of the single video signal produced by the synthesizing means so as to produce a digital signal.

Timing signals are sent to the synthesizing means, the A/D conversion means and the D/A conversion means so as to function as D/A and A/D conversion clocks, for example, in response to output timing of the CCD. A sampling-hold means can be used between an amplifier and the synthesizing means in place of the A/D conversion means and the D/A conversion means.

The video output signals are introduced into the video output signal lines in order of the picture elements and then sent to the synthesizing means by way of the video output signal lines. A digital-analog conversion means (hereinafter called D/A conversion means) is placed next to the synthesizing means for digital-analog converting the digital signal of the A/D conversion means so as to produce an analog video signal. An amplifier is placed between the synthesizing means and the A/D conversion means for amplifying the video signal. A video signal forming means is additionally provided for the purpose of treating the analog signal of the D/A conversion portion so as to produce a video output signal. An amplifier can be placed between the D/A conversion means and the video signal forming means for amplifying the video signal.

Two amplifiers can be used. For example, a first amplifier is placed between the synthesizing means and the A/D conversion means for amplifying the video signal, and a second amplifier placed between the D/A conversion means and the video signal forming means for amplifying the video signal.

It is preferable that the output signal of the synthesizing means is analog-digital converted as to each picture image area in the A/D conversion means according to constant timing clock pulses which function as output timing pulses for the CCD, and wherein such analog-digital converted video signal is digital-analog converted according to constant timing clock pulses which function as output timing pulses for the CCD, to thereby produce D/A converted waves. A rising point of each of the clock pulses is delayed so as to move out of each occurrent points of synthetic spike noises. It is preferable that analog-digital conversion timing in the A/D conversion means is synchronized with synthetic spike noise occurrence timing.

In case the sampling-hold means is used, an amplifier can be connected to the sampling-hold means for amplifying the video signal, and a video signal forming means is connected to the amplifier for treating the amplified signal from the amplifier so as to produce a video output signal. Also, an amplifier can be placed between the synthesizing means and the sampling-hold means for amplifying the video signal. In this case, a video signal forming means can be connected to the sampling-hold means for treating the signal of the sampling-hold means so as to produce a video output signal, and another amplifier can be additionally placed between the video signal forming means and the sampling-hold means for amplifying the video signal.

PREFERRED EMBODIMENTS OF THE PRESENT INVENTION

Figure 1:
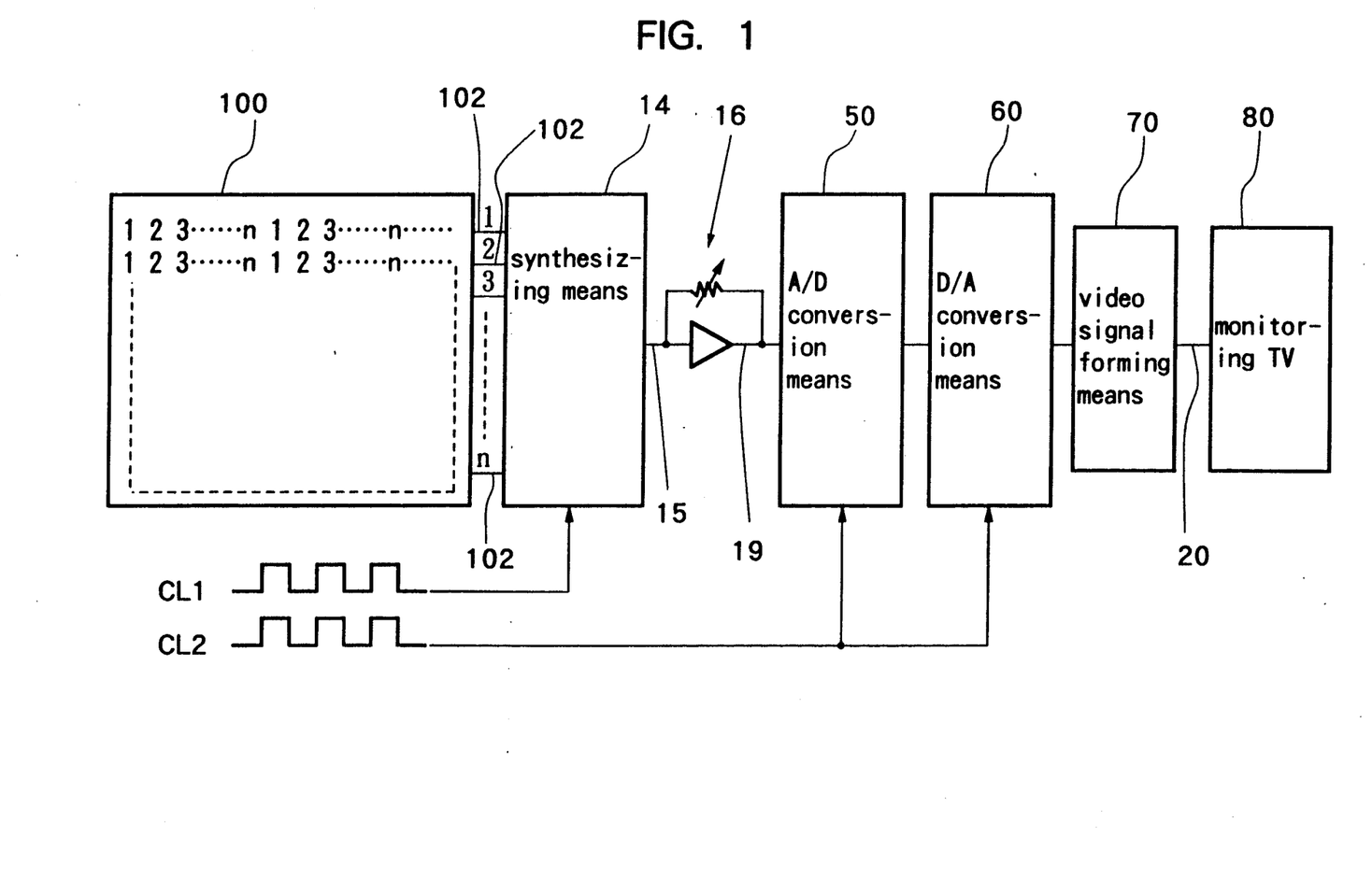
FIG. 1 is an explanatory view showing a CCD image pickup apparatus according to a first embodiment of the present invention.

Referring to FIG. 1, a charge-coupled device (CCD) has plural horizontal scanning lines, and plural picture elements numbered "1 2 3 ... n, 1 2 3 ... n, ... n" which are arranged along each of the horizontal sccaning lines. The arrangement "1 2 3 ... n" is formed in each single picture element. Plural video output signals numbered "1 2 3 ... n, 1 2 3 ... n, ... n" are produced and introduced into each of the video output signal lines 102 from the CCD 100.

Figure 3:
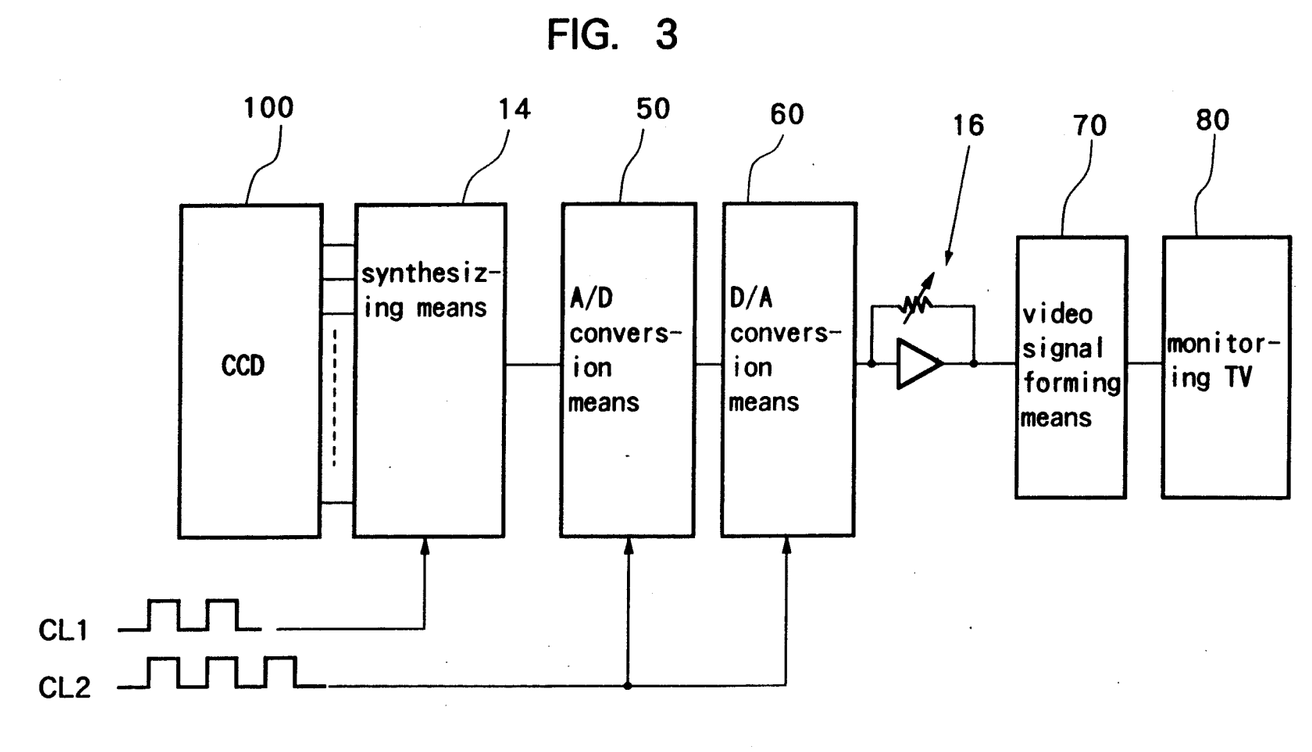
FIG. 3 is an explanatory view showing a CCD image pickup apparatus according to a second embodiment of the present invention, corresponding to FIG. 1.
Figure 4:
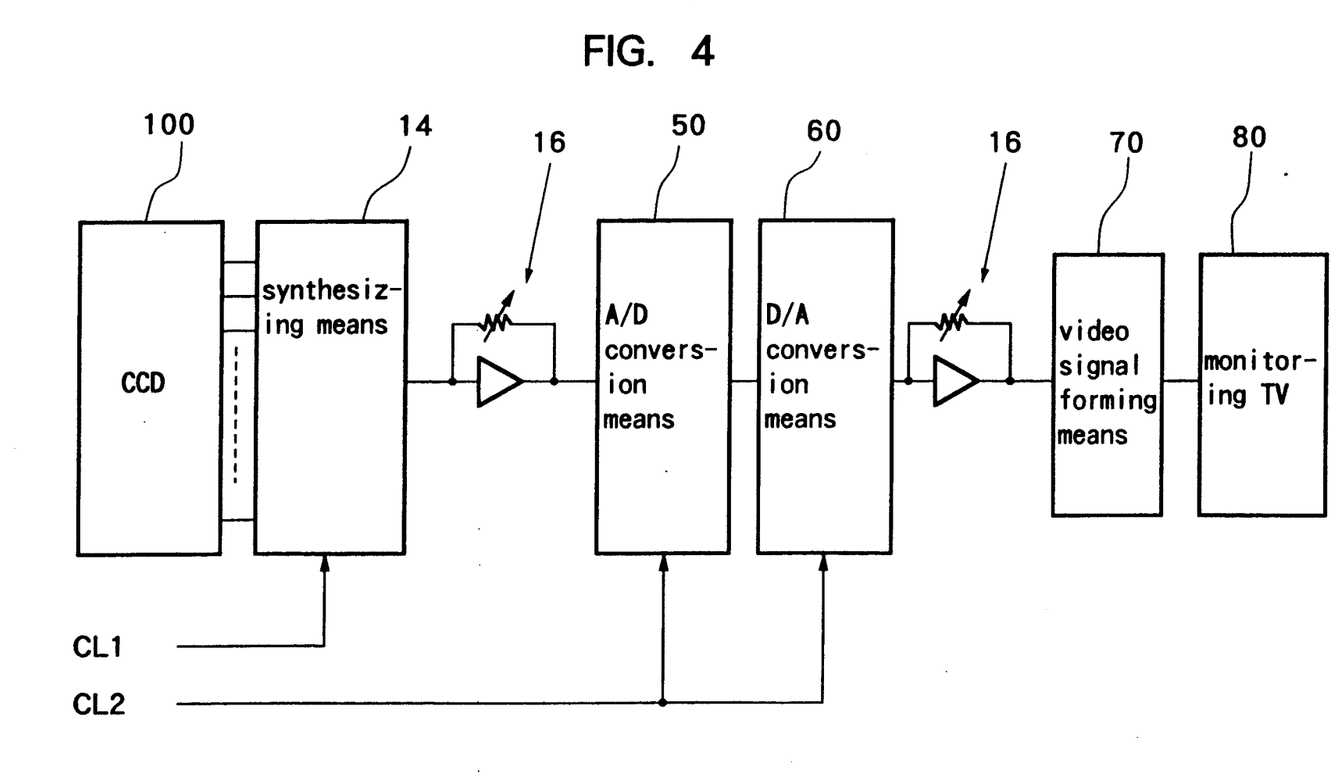
FIG. 4 is an explanatory view showing a CCD image pickup apparatus according to a third embodiment of the present invention, corresponding to FIG. 1.

The CCD 100 is connected to a synthesizing means 14 by way of the video output signal lines 102 numbered "1 ... n". The plural video output signals are sent from the CCD 100 through the video output signal lines 102 to the synthesizing means 14 where they are synthesized so as to produce a single video signal 15. The synthesizing means 14 is connected to an amplifier 16 where the video signal 15 is amplified so as to produce a video synthetic output wave 19. A rear portion of the amplifier 16 is connected to an A/D conversion means 50 and then a D/A conversion means 60. Timing signals CL1 and CL2 are sent to the synthesizing means 14, the A/D conversion means 50 and the D/A conversion means 60 so as to function as D/A and A/D conversion clocks, as shown in FIGS. 1, 3 and 4.

Figure 2:
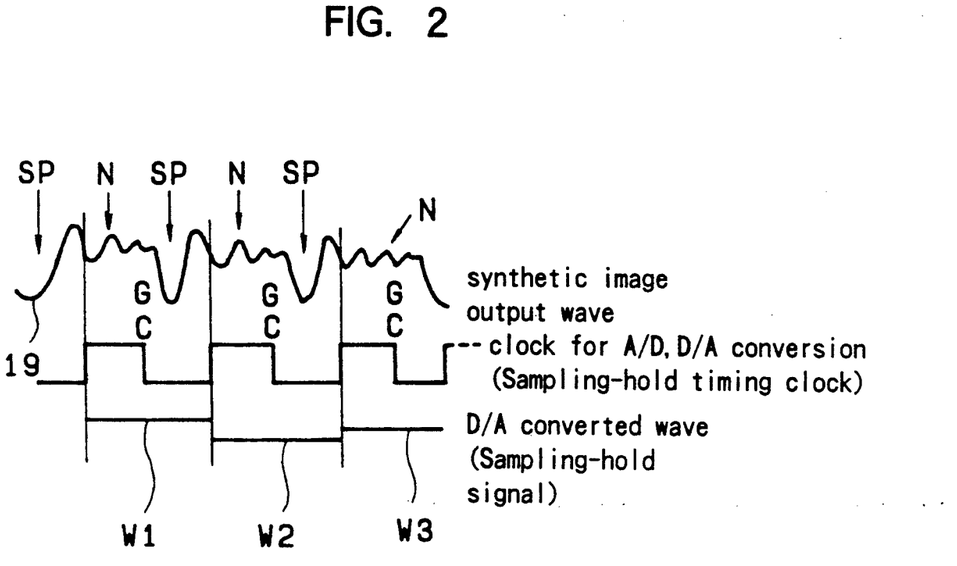
FIG. 2 is an explanatory view showing a video synthetic output wave, a clock wave and a D/A converted wave.

FIG. 2 shows a single video synthetic output wave 19 which is amplified by the amplifier 16. This video synthetic output wave 19 includes typically three picture image areas G. At this stage, the synthetic output wave 19 contains the synthetic spike noises SP and other noises N such as ringing and overshoot.

Referring again to FIG. 1, the video synthetic output wave 19 is analog-digital converted as to each of the picture image areas G in the A/D conversion means 50 according to the constant timing clock pulses C (FIG. 2) which function as output timing pulses for the CCD 100, so as to produce an analog-digital converted video signal. After that, this analog-digital converted video signal is digital-analog converted according to the timing clock pulses C (FIG. 2) functioning as output timing pulses for the CCD 100, to thereby produce the D/A converted waves $W_1$, $W_2$, $W_3$. According to the constant timing clock pulses C, each picture element G is analog-digital converted whereby the synthetic spike noises SP can be perfectly canceled or removed even if the video signal 15 is largely amplified by the amplifier 16. The rising point of each clock pulse C or the start timing of each analog-digital conversion is delayed so as to move out of the occurrence points of the synthetic spike noises SP as shown in FIG. 2. The analog-digital conversion timing is set manually or automatically at any position within each picture element G, excluding the interconnecting portions of the picture elements where the synthetic spike noises SP occur. The noises such as ringing and overshoot which occurs by the synthesizing of the plural signals have a constant pattern. Whenever the synthetic spike noises SP occur at the interconnection between the picture elements, the analog-digital conversion should be avoided.

Accordingly, if such conversion is carried out, the analog-digital timing wave can be easily prepared without any fine adjustment of the conversion timing.

The thus-produced digital-anolog converted wave is subject to such treatments as addition of synchronizing signals and/or pedestal levels or gamma amendment in a video signal forming means 70 so as to produce a video output signal 20 for the purpose of projection on a monitoring TV 80.

According to the first embodiment of FIG. 1, all synthetic spike noises SP can be canceled so that the gain of the amplifier can be set high. In addition, high resolution, excellent sensitivity or clearness and a high S/N value can be obtained in the video signal output signals.

In particular, according to the embodiment of FIG. 1, remarkable advantages in these respects can be obtained as explained as follows.

According to the prior art CCD image pickup apparatus, before the plural video output signals are synthesized, it is necessary to finely adjust all signal levels so as to become equal to each other for the purpose of cancelling any differences in level among the plural lines connected to the CCD 100 in the circuit in two opposite conditions one of which is a dark condition with no light being introduced into the CCD 100 and the other of which is a bright condition with light being uniformly introduced into the CCD 100. However, when such fine adjustment is carried out by a synchroscope or the like, due to the synthetic spike noises SP, it is very difficult to adjust the levels properly because an adjusted level is apt to change depending on an operator.

By contrast, according to the embodiment of FIG. 1, the analog-digital converted digital values can be introduced into a computer so as to carry out display and determination. Any fine adjustment of all video output signal levels can be achieved in a quantitative manner. As a result, adjustment differences depending on an operator can be avoided.

If the synthetic spike noises occur periodically in substantially same pattern, the analog-digital conversion timing is preferably synchronized with the synthetic spike noise occurrence timing. Even if it is set within the period of synthetic spike noise occurrence, a high resolution signal can be obtained although some biasing change takes place.

FIG. 3 shows a second embodiment of the present invention. The amplifier 16 is placed between the D/A conversion means 60 and the video signal forming means 70.

In a third embodiment shown in FIG. 4, the amplifier 16 is positioned between the synthesizing means 14 and the A/D conversion means 50. In addition, another amplifier 16 is placed between the D/A conversion means 60 and the video signal forming means 70.

The advantageous effects of the second and third embodiments of FIGS. 3 and 4 are substantially the same as those of the first embodiment of FIG. 1.

Figure 5:
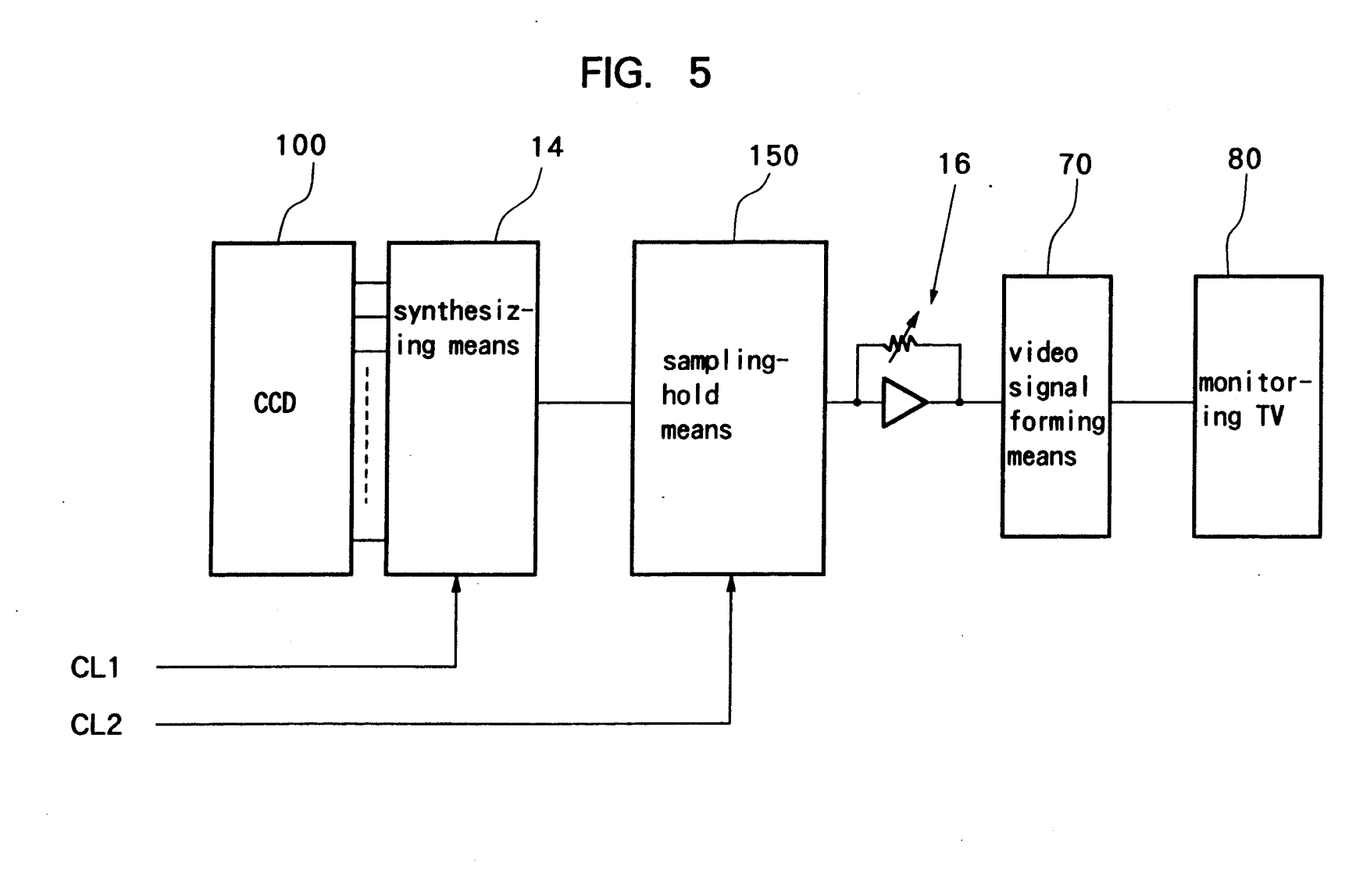
FIG. 5 is an explanatory view showing a CCD image pickup apparatus according to a fourth embodiment of the present invention.
Figure 6:
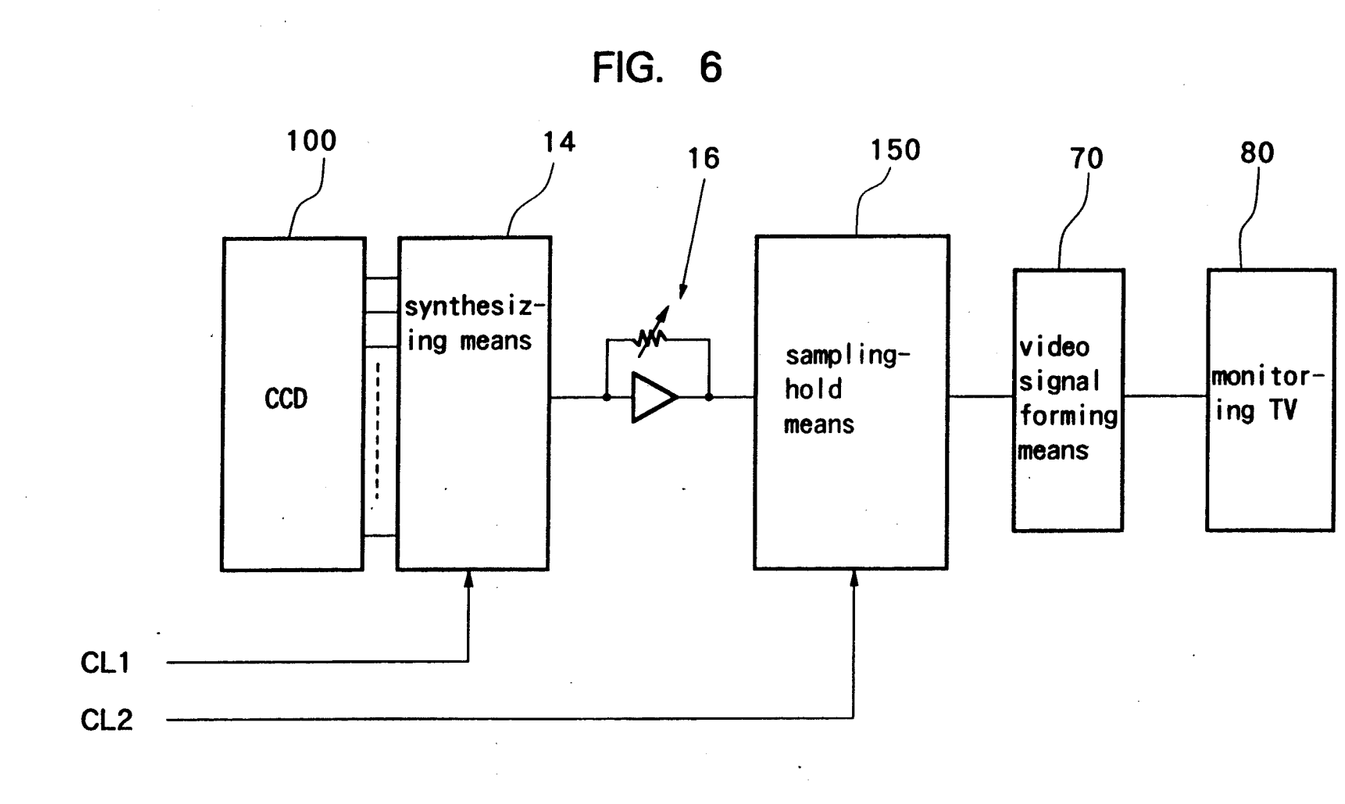
FIG. 6 is an explanatory view showing a CCD image pickup apparatus according to a fifth embodiment of the present invention.
Figure 7:
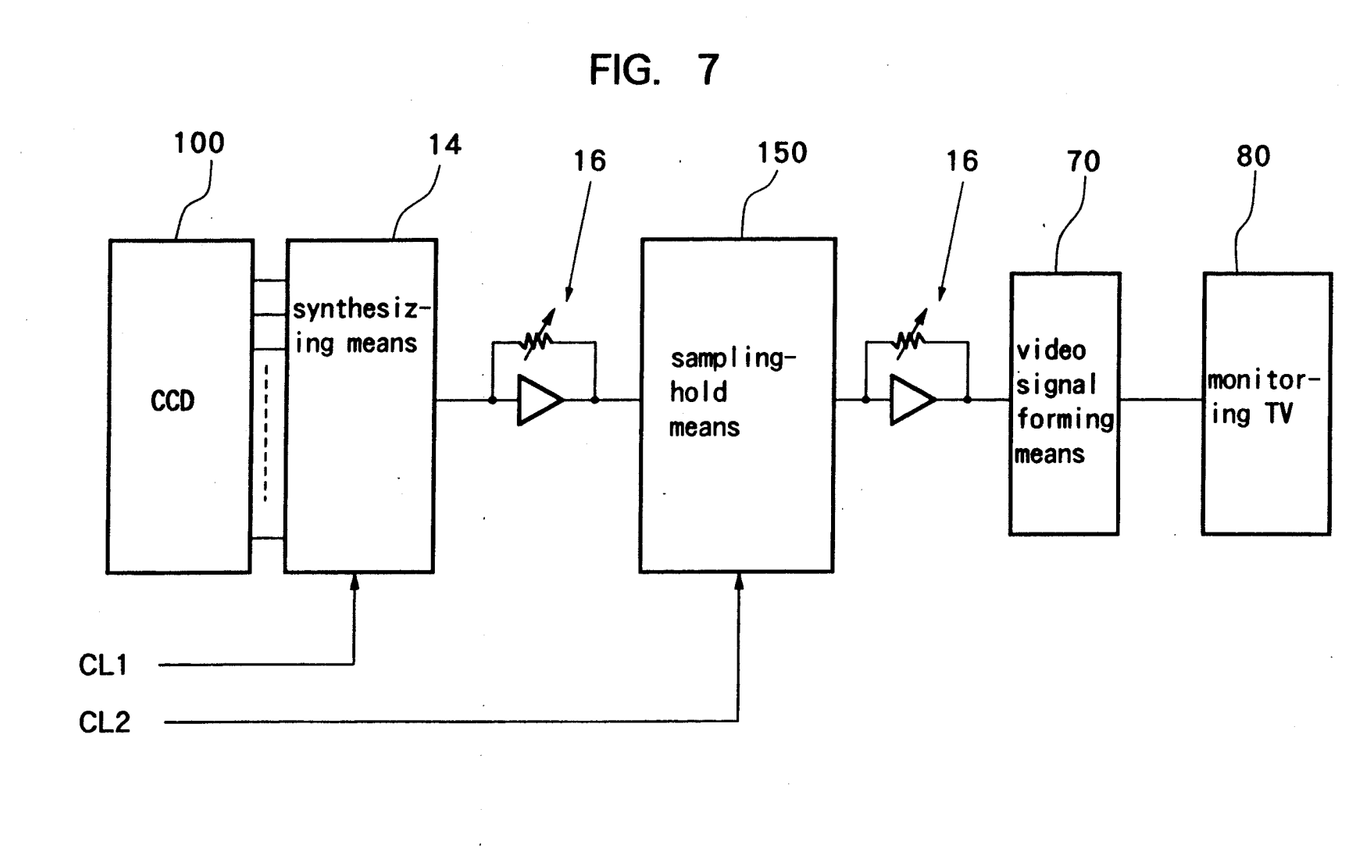
FIG. 7 is also an explanatory view showing a CCD image pickup apparatus according to a sixth embodiment of the present invention.

FIG. 5 shows a fourth embodiment of the present invention in which a sampling-hold means 150 is arranged between the amplifier 16 and the synthesizing means 14 in place of the A/D conversion means 50 and the D/A conversion means 60. Timing signals CL1 and CL2 are sent to the synthesizing means 14 and the sampling means 150 so as to function as sampling-hold timing clocks, as shown in FIGS. 5, 6 and 7. The sampling-hold means samples and holds the single video signal of the synthesizing means in response to the sampling-hold timing clocks or timing of the CCD to thereby produce a video signal in substantially the same manner as those of the first embodiment of FIG. 1 as shown in FIG. 2 although a sampling-hold timing clock and a sampling-hold signal are used in place of the clock for A/D and D/A conversion and the D/A converted wave, respectively. As a result, the synthetic spike noises can be cancelled.

FIG. 6 shows a fifth embodiment of the present invention in which the sampling-hold means 150 is placed between the amplifier 16 and the video signal forming means 70.

FIG. 7 shows a sixth embodiment of the present invention in which the sampling-hold means 150 is placed between the two amplifiers 16.

The reference numerals in FIGS. 5, 6 and 7 are identical with those in the corresponding parts shown in FIG. 1. Thus, some explanation on such parts with the identical reference numerals is omitted with respect to the embodiments shown in FIGS. 5, 6, and 7. The advantageous effects of the embodiments of FIGS. 5, 6 and 7 are substantially the same as those of the embodiment of FIG. 1.

According to the present invention, the synthetic spike noises can be perfectly canceled so that the gain of the amplifier can be set very high whereby the analog-digital converted video signals can have high resolution, excellent sensitivity and high S/N value.

According to the invention, the video waves excluding any synthetic spike noises can be obtained.

What is claimed is:
1. A CCD image pickup apparatus comprising:
  a CCD having a plurality of scanning lines and a plurality of picture elements arranged along each of the horizontal scanning lines;
  a plurality of video output signal lines connected to the CCD in such a manner that a plurality of video output signals are produced by the CCD and introduced into the video output signal lines;

a video signal synthesizing means for synthesizing the video output signals so as to produce a single video signal;

means for producing timing clock pulses;

means for delaying a transition point of each of the timing clock pulses so as to move out of each occurring point of synthetic spike noises; and an A/D conversion means for analog-digital converting according to the timing clock pulses the single video signal produced by the synthesizing means so as to produce a digital signal.

2. A CCD image pickup apparatus defined in claim 1, wherein the video output signals are arranged in each horizontal scanning line so as to constitute plural units, each unit consisting of plural picture elements (1-n), and after that the video output signals are introduced into the video output signal lines according to the arranged order (1-n) of the picture elements and then sent to the synthesizing means by way of the video output signal lines.

3. A CCD image pickup apparatus as defined in claim 1, further comprising a D/A conversion means for digital-analog conversion of the digital signal of the A/D conversion means so as to produce an analog video signal.

4. A CCD image pickup apparatus as defined in claim 3, further comprising a video signal forming means for treating the analog signal of the D/A conversion means so as to produce a video output signal.

5. A CCD image pickup apparatus as defined in claim 4, further comprising an amplifier located between the D/A conversion means and the video signal forming means for amplifying the video signal.

6. A CCD image pickup apparatus as defined in claim 4, further comprising a first amplifier located between the synthesizing means and the A/D conversion means for amplifying the video signal and a second amplifier located between the D/A conversion means and the video signal forming means for amplifying the video signals.

7. A CCD image pickup apparatus as defined in claim 4, wherein the video signal includes plural picture image areas, and wherein the output signal of the synthesizing means is analog-digital converted in each of the picture image areas, and wherein such analog-digital converted video signal is digital-analog converted according to the timing clock pulses, to thereby product D/A converted waves.

8. A CCD image pickup apparatus as defined in claim 7, wherein the timing clock pulses are regular timing clock pulses.

9. A CCD image pickup apparatus as defined in claim 7, wherein the timing clock pulses are regular timing clock pulses for the CCD.

10. A CCD image pickup apparatus as defined in claim 3, further comprising means for producing clock signals, and wherein the clock signals are provided to the synthesizing means, the A/D conversion means and the D/A conversion means.

11. A CCD image pickup apparatus as defined in claim 10, wherein the clock signals are timing clock pulses.

12. A CCD image pickup apparatus as defined in claim 1, further comprising an amplifier located between the synthesizing means and the A/D conversion means for amplifying the video signal.

13. A CCD image pickup apparatus as defined in claim 1, wherein the transition point is a rising point of each of the clock pulses.

14. A CCD image pickup apparatus, comprising:

a CCD having a plurality of horizontal scanning lines and a plurality of picture elements arranged along each of the horizontal scanning lines;

a plurality of video output signal lines connected to the CCD in such a manner that a plurality of video output signals are produced by the CCD and introduced into the video output signal lines;

a video signal synthesizing means for synthesizing the video output signals so as to produce a single video signal;

means for producing timing clock pulses;

means for delaying a transition point of each of the timing clock pulses so as to move out of each occurring point of synthetic spike noises; and A/D conversion means for analog-digital converting according to the timing clock pulses the single video signal produced by the synthesizing means so as to produce a digital signal, the video signal including plural picture image areas, the output signal of the synthesizing means being analog-digital converted in each of the picture image areas, such analog-digital converted video signal being digital-analog converted according to the timing clock pulses, to thereby produce D/A converted waves, wherein analog-digital conversion timing in the A/D conversion means is synchronized with synthetic spike noise occurrence timing.

15. A CCD image pickup apparatus comprising:

a CCD having a plurality of horizontal scanning lines and a plurality of picture elements arranged along each of the horizontal scanning lines;

a plurality of video output signal lines connected to the CCD in such a manner that a plurality of video output signals are produced by the CCD and introduced into the video output signal lines;

a video signal synthesizing means for synthesizing the video output signals so as to produce a single video signal;

means for producing timing clock pulses;

means for delaying a transition point of each of the timing clock pulses so as to move out of each occurring point of synthetic spike noises; and a sampling-hole means for sampling-holding according to the timing clock pulses the single video signal of the synthesizing means to thereby produce a video signal.

16. A CCD image pickup apparatus as defined in claim 15, wherein the video output signals are arranged in each horizontal scanning line so as to constitute plural units, each unit consisting of plural picture elements (1-n), and after that the video output signals are introduced into the video output signal lines according to the arranged order (1-n) of the picture elements and then sent to the synthesizing means by way of the video output signal lines.

17. A CCD image pickup apparatus as defined in claim 15, further comprising an amplifier connected to the sampling-hold means for amplifying the video signal.

18. A CCD image pickup apparatus as defined in claim 17, further comprising a video signal forming means connected to the amplifier for treating the amplified signal from the amplifier so as to produce a video output signal.

19. A CCD image pickup apparatus as defined in claim 15, further comprising an amplifier located between the synthesizing means and the sampling-hold means for amplifying the video signal.

20. A CCD image pickup apparatus as defined in claim 19, further comprising a video signal forming means connected to the sampling-hold means for treating the signal of the sampling-hold portion so as to produce a video output signal.

21. A CCD image pickup apparatus as defined in claim 20, further comprising another amplifier located between the video signal forming means and the sampling hold means for amplifying the video signal.

22. A CCD image pickup apparatus as defined in claim 15, wherein plural sampling-hold timing clock signals are provided to the synthesizing means while plural sampling-hold timing clock signals are provided to the sampling-hold means.

23. A CCD image pickup apparatus as defined in claim 22 wherein the clock signals are regular timing clock pulses.

24. A CCD image pickup apparatus as defined in claim 15, wherein the transition point is a rising point of each of the clock pulses.

25. A CCD image pickup apparatus comprising:
a CCD having a plurality of horizontal scanning lines and a plurality of picture elements arranged along each of the horizontal scanning lines;
a plurality of video output signal lines connected to the CCD in such a manner that a plurality of video output signals are produced by the CCD and introduced into the video output signal lines;
a video signal synthesizing means for synthesizing the video output signals so as to produce a single video signal;
means for delaying a transition point of each of the timing clock pulses so as to move out of each occurring point of synthetic spike noises;
means for producing timing clock pulses;
A/D conversion means for analog-digital converting according to the timing clock pulses the single video signal produced by the synthesizing means so as to produce a digital signal;
D/A conversion means for digital-analog converting the digital signal of the A/D conversion means so as to produce an analog video signal; and
means for producing clock signals which are provided to the synthesizing means, the A/D conversion means and the D/A conversion means.

* * * * *